(12) United States Patent
Fischer et al.

(10) Patent No.: US 10,293,588 B2
(45) Date of Patent: May 21, 2019

(54) ARRANGEMENT FOR PRODUCING A CORRUGATED BOARD WEB LAMINATED ON ONE SIDE

(71) Applicant: BHS Corrugated Maschinen-und Anlagenbau GmbH, Weiherhammer (DE)

(72) Inventors: Markus Fischer, Mantel (DE); Sebastian Schieder, Letzau (DE)

(73) Assignee: BHS Corrugated Maschinen-und Anlagenbau GmbH, Weiherhammer (DE)

(*) Notice: Subject to any disclaimer, the term of this patent is extended or adjusted under 35 U.S.C. 154(b) by 987 days.

(21) Appl. No.: 14/283,669

(22) Filed: May 21, 2014

(65) Prior Publication Data

US 2014/0345804 A1   Nov. 27, 2014

(30) Foreign Application Priority Data

May 23, 2013   (DE) .................. 10 2013 209 603

(51) Int. Cl.
*B31F 1/28* (2006.01)
*B32B 37/10* (2006.01)
*B32B 38/00* (2006.01)

(52) U.S. Cl.
CPC ........ *B32B 37/1036* (2013.01); *B31F 1/2831* (2013.01); *B31F 1/2877* (2013.01); *B32B 38/0012* (2013.01)

(58) Field of Classification Search
CPC .... B31F 1/2877; B31F 1/2831; B31F 1/2836; B31F 1/284
See application file for complete search history.

(56) References Cited

U.S. PATENT DOCUMENTS

| 4,527,686 A | * | 7/1985 | Satoh | B65G 39/16 |
| | | | | 198/807 |
| 5,389,183 A | * | 2/1995 | Seki | B31F 1/2831 |
| | | | | 156/210 |
| 5,518,457 A | * | 5/1996 | Seki | B31F 1/2831 |
| | | | | 474/102 |

(Continued)

FOREIGN PATENT DOCUMENTS

| DE | 196 16 945 A1 | 10/1997 |
| DE | 694 15 975 T2 | 8/1999 |

(Continued)

OTHER PUBLICATIONS

Extended European Search Report dated Oct. 28, 2014.

*Primary Examiner* — Michael N Orlando
*Assistant Examiner* — Marta S Dulko
(74) *Attorney, Agent, or Firm* — McGlew and Tuttle, P.C.

(57) ABSTRACT

An arrangement for producing a corrugated board web. The arrangement includes corrugating rollers to produce a corrugated web, a glue application mechanism and a pressure belt module, which comprises a deflection roller with a deflection roller longitudinal center axis, a belt tensioning and belt running regulating roller with a belt tensioning and belt running regulating roller longitudinal center axis and a pressure belt, which is guided about the deflection roller and the belt tensioning and belt running regulating roller, to press a cover web onto the corrugated web provided with glue.

20 Claims, 6 Drawing Sheets

(56) References Cited

U.S. PATENT DOCUMENTS

| | | | | |
|---|---|---|---|---|
| 5,632,850 A | * | 5/1997 | Knorr | B31F 1/2877 |
| | | | | 100/153 |
| 5,906,305 A | | 5/1999 | Knorr | |
| 5,951,817 A | * | 9/1999 | Thomas | B31F 1/2877 |
| | | | | 156/470 |
| 6,085,053 A | * | 7/2000 | Saeki | G03G 15/754 |
| | | | | 399/165 |
| 6,181,900 B1 | * | 1/2001 | Lee | G03G 15/755 |
| | | | | 198/806 |
| 6,200,036 B1 | * | 3/2001 | Girardey | B65G 23/44 |
| | | | | 384/260 |
| 6,786,325 B2 | * | 9/2004 | Powell | B65G 39/16 |
| | | | | 198/806 |
| 8,297,846 B2 | * | 10/2012 | Meyer | B65G 39/09 |
| | | | | 193/37 |
| 8,346,140 B2 | * | 1/2013 | Yasumoto | G03G 15/0131 |
| | | | | 198/804 |
| 2008/0308233 A1 | * | 12/2008 | Nitta | B31F 1/2836 |
| | | | | 156/472 |

FOREIGN PATENT DOCUMENTS

| | | |
|---|---|---|
| EP | 0 698 752 A2 | 2/1996 |
| EP | 2 476 547 A1 | 7/2012 |
| WO | 99/08866 A1 | 2/1999 |

\* cited by examiner

ARRANGEMENT FOR PRODUCING A CORRUGATED BOARD WEB LAMINATED ON ONE SIDE

CROSS-REFERENCES TO RELATED APPLICATIONS

This application claims the priority of German Patent Application, Serial No. 10 2013 209 603.8, filed May 23, 2013, pursuant to 35 U.S.C. 119(a)-(d), the content of which is incorporated herein by reference in its entirety as if fully set forth herein.

FIELD OF THE INVENTION

The invention relates to an arrangement for producing a corrugated board web laminated on one side. A corrugated board web laminated on one side comprises a corrugated web having a corrugation and a cover web connected thereto.

BACKGROUND OF THE INVENTION

The prior art discloses generic arrangements of this type. Arrangements are known, for example, from the prior art, which comprise a movable tensioning roller, a heating roller and a tiltable regulating roller arranged between them. A pressure belt, which is generally formed from a metal weave, is guided around the rollers. The course of the pressure belt can be influenced by tilting the regulating roller, while a movement of the tensioning roller acts on the tension of the pressure belt. The pressure belts are subject to a high degree of wear, which greatly reduces their service life. High forces are required to adjust the rollers. These arrangements have a very large space requirement. Furthermore, they are extremely expensive to acquire.

SUMMARY OF THE INVENTION

The invention is based on an object of providing an arrangement for producing a corrugated board web laminated on one side, which overcomes the drawbacks given above. In particular, an arrangement is to be provided, in which the pressure belt, during operation, substantially has an identical wrap length or running length over its width. Furthermore, the regulating forces to regulate the course of the pressure belt and the tensioning forces should be extremely low.

This object is achieved according to the invention by an arrangement for producing a continuous corrugated board web, which is laminated on one side, with a first corrugating roller and a second corrugating roller to produce a corrugated web having a corrugation, with a glue application mechanism for applying glue to tips of the corrugation, and with a pressure belt module, which comprises a deflection roller and which has a deflection roller longitudinal centre axis, a belt tensioning and belt running regulating roller, which has a belt tensioning and belt running regulating roller longitudinal centre axis, a continuous pressure belt guided about the deflection roller and the belt tensioning and belt running regulating roller to press a cover web onto the tips, which are provided with glue, of the corrugated web resting, in regions, on the first corrugating roller, a belt tensioning and belt running regulating roller adjustment device to adjust the belt tensioning and belt running regulating roller, wherein the belt tensioning and belt running regulating roller adjustment device comprises a belt tensioning adjustment device for tensioning the pressure belt by uniformly changing the spacing of the belt tensioning and belt running regulating roller longitudinal centre axis from the deflection roller longitudinal centre axis over the belt tensioning and belt running regulating roller longitudinal centre axis and a belt running regulating adjustment device to adjust the course of the pressure belt by tilting the belt tensioning and belt running regulating roller longitudinal centre axis relative to the deflection roller longitudinal centre axis, a pressure belt detection mechanism associated with the pressure belt, a pressure belt regulating mechanism, which has a signal connection to the pressure belt detection mechanism, and an adjusting device, which is connected to the belt tensioning and belt running regulating roller adjustment device, to adjust the belt tensioning and belt running regulating roller depending on regulating signals received from the pressure belt regulating mechanism.

The core of the invention is that the pressure belt can be regulated with respect to its course in the running direction and can also be changed with respect to its tension by the belt tensioning and belt running regulating roller. The belt tensioning and belt running regulating roller therefore takes on the function of a belt tensioning roller and a belt running regulating roller. A belt tensioning adjustment mechanism is provided to change the tension of the pressure belt, while a belt running regulating adjustment mechanism is present to regulate the course of the pressure belt.

The uniform change in the spacing of the belt tensioning and belt running regulating roller from the deflection roller for pure belt tensioning preferably takes place linearly and/or in the form of a curve, preferably in the form of a circular arc. The expression "uniform change" is preferably taken to mean a change in such a way that the belt tensioning and belt running regulating roller longitudinal centre axis, before and after changing the spacing, has an identical orientation to the deflection roller longitudinal centre axis. The spacing can be increased or reduced. When the spacing is increased, an increase in the tension of the pressure belt takes place while when the spacing is reduced, a reduction in the tension of the pressure belt takes place.

The tilting movement of the belt tensioning and belt running regulating roller relative to the deflection roller preferably takes place linearly and/or in the form of a curve, preferably in the form of a circular arc. During tilting, the angle of the belt tensioning and belt running regulating roller changes with respect to the deflection roller.

The belt tensioning adjustment mechanism and the belt running regulating adjustment mechanism can be actuated separately or together, which then leads to a separate pure tensioning of the pressure belt and pure regulation of the course of the pressure belt or to a combined tensioning of the pressure belt and regulation of the course of the pressure belt.

The detection mechanism is preferably configured as a sensor mechanism.

It is advantageous if the regulating mechanism is an electric or electronic regulating mechanism.

It is advantageous if the adjusting device comprises at least one belt tensioning adjusting means and at least one belt running regulating adjusting actuator. The belt tensioning adjusting means can advantageously be changed with respect to its length. The belt running regulating adjusting actuator is preferably a belt running regulating pivot adjusting actuator.

The adjusting device is connected to the belt tensioning and belt running regulating roller adjustment device.

The signal connections are wireless or wire-bound.

It is advantageous if the deflection roller and/or the belt tensioning and belt running regulating roller can be heated or is/are heated during operation.

The detection mechanism, in which the pressure belt detection mechanism detects at least two running lengths, which are spaced apart from one another over the width of the pressure belt, of the pressure belt in the running direction thereof, directly measures, for example, the running lengths of the pressure belt in the peripheral direction. Alternatively, it determines information for calculating the running lengths of the pressure belt in the peripheral direction. Conclusions about the belt tension of the pressure belt and/or about the course of the pressure belt are possible by means of the running lengths that are then known.

Disclosed are preferred positions for determining the running lengths of the pressure belt, in which the pressure belt detection mechanism detects two edge running lengths of the pressure belt in the running direction thereof in mutually opposing edge regions of the pressure belt and a central running length present between them of the pressure belt in the running direction thereof. By detecting the outer edge running lengths, differences in the running lengths can thus be recognized particularly easily and clearly.

The adjustment in the belt tensioning and belt running regulating roller, in which the adjusting device adjusts the belt tensioning and belt running regulating roller in such a way that the running lengths of the pressure belt are substantially identical over the width thereof, leads to a particularly homogeneous or low tension of the pressure belt, which in turn results in a very high service life of the pressure belt. Moreover, this has a positive effect on the quality of the corrugated board web.

The configuration, in which the belt tensioning and belt running regulating roller is rotatably mounted in a bearing mechanism, allows a rotatable mounting of the belt tensioning and belt running regulating roller. It is advantageous if the belt tensioning and belt running regulating roller engages in the bearing mechanism. Alternatively, the bearing mechanism engages in the belt tensioning and belt running regulating roller on the end face.

Further, a preferred mounting of the belt tensioning and belt running regulating roller is disclosed, wherein preferably the bearing mechanism comprises a bearing body, which is arranged at the end with respect to the belt tensioning and belt running regulating roller and predetermines a respective bearing axis, for the rotatable mounting of the belt tensioning and belt running regulating roller. The belt tensioning and belt running regulating roller is rotatably mounted on both sides by the bearing bodies of the bearing mechanism. The belt tensioning and belt running regulating roller preferably has two bearing journals at the end face, which engage in the bearing bodies or pass through them. The bearing bodies then have bearing openings to receive the bearing journals. Alternatively, the bearing bodies engage in the belt tensioning and belt running regulating roller at the end face.

Each of the bearing bodies is eccentrically articulated with respect to the bearing axis by means of an articulation body, such as a bolt, pin or the like, on a respective lever part and can be pivoted relative to the lever part. The articulation body predetermines a pivot axis for the bearing body or the belt tensioning and belt running regulating roller.

The belt tensioning adjusting means, in which the adjusting device comprises belt tensioning adjusting means, one of the belt tensioning adjusting means in each case acting between one of the bearing bodies and one of the lever parts for the uniform pivoting of the bearing bodies about the articulation body, can preferably be adjusted with respect to their length or are telescopic. They are preferably eccentrically articulated on the bearing bodies and the lever parts, spaced apart from the articulation bodies. It is advantageous if the belt tensioning and belt running regulating roller longitudinal centre axis runs substantially between the articulation body and a coupling body, which couples the belt tensioning adjusting means to the lever part.

The coupling members, in which the belt running regulating adjustment mechanism comprises coupling members, each of the coupling members being connected to one of the lever parts by means of a coupling part, are preferably configured as arms, levers or the like. It is advantageous if the coupling members are arranged eccentrically on the lever parts, spaced apart from the articulation bodies. The coupling members preferably run parallel to one another. The coupling parts are, for example, coupling pins.

The coupling members are coupled to one another by means of a synchronous shaft by connection means. The connection means, having connection means axes running parallel and spaced apart with respect to one another and having an identical spacing from a synchronous shaft longitudinal centre axis for the displacement of the lever parts by the same amount in opposite direction, are preferably configured as connection journals. The connection means and the coupling members are connected to one another in an articulated manner. The connection means have a non-rotatable connection to the synchronous shaft. It is advantageous if the synchronous shaft has a synchronous shaft longitudinal centre axis, the connection means axes of the connection means running offset or spaced apart by an identical amount from the synchronous shaft longitudinal centre axis. The synchronous shaft longitudinal centre axis thus runs between the coupling axes or the connection means axes. If the belt tensioning and belt running regulating roller is locally displaced on a first side by an amount, the other side is conversely locally displaced by the same amount. If, in other words, on one side, for example, the belt tensioning and belt running regulating roller is raised, it is simultaneously accordingly lowered on the other side. The virtual tilting point of the belt tensioning and belt running regulating roller is preferably located substantially centrally with respect to the longitudinal extent of the synchronous shaft on the belt tensioning and belt running regulating roller longitudinal centre axis.

The adjusting device comprises an adjusting actuator, by means of which the coupling members or lever parts can be pivoted It is advantageous if the adjusting actuator is directly or indirectly coupled to the synchronous shaft to pivot it about its synchronous shaft longitudinal centre axis. A pivoting of the synchronous shaft about its synchronous shaft longitudinal centre axis in turn results in a pivoting of the connection means about the synchronous shaft longitudinal centre axis, which in turn results in a pivoting of the coupling members, which are connected to the lever parts by the coupling parts. Owing to the uniform tilting of the belt tensioning and belt running regulating roller brought about from both sides of the belt tensioning and belt running regulating roller relative to the deflection roller, only slight running lengths differences of the pressure belt occur upon tilting the belt tensioning and belt running regulating roller relative to the deflection roller. During the tilting of the belt tensioning and belt running regulating roller relative to the deflection roller, a displacement or tilting on both sides takes place of the belt tensioning and belt running regulating roller relative to the deflection roller. Thus, only small regulating forces are furthermore required.

Alternatively, the adjusting actuator engages on one of the coupling members.

The pivoting bearing means, in which each lever part, between the articulation body and the coupling part, comprises a pivot bearing means for its pivotable arrangement, is preferably configured as a bearing opening. Alternatively, it may, however, also be a bearing journal or the like. The lever parts are preferably articulated to machine housing, machine frame or the like. The pivot bearing means is arranged between the coupling body coupling the belt tensioning adjusting means to the lever part and the coupling part.

A preferred embodiment of the invention will be described by way of example below with reference to the accompanying drawings.

BRIEF DESCRIPTION OF THE DRAWINGS

FIG. 10 shows a view corresponding to FIG. 9, various lever lengths being drawn in.

DESCRIPTION OF THE PREFERRED EMBODIMENT

Figure 1:
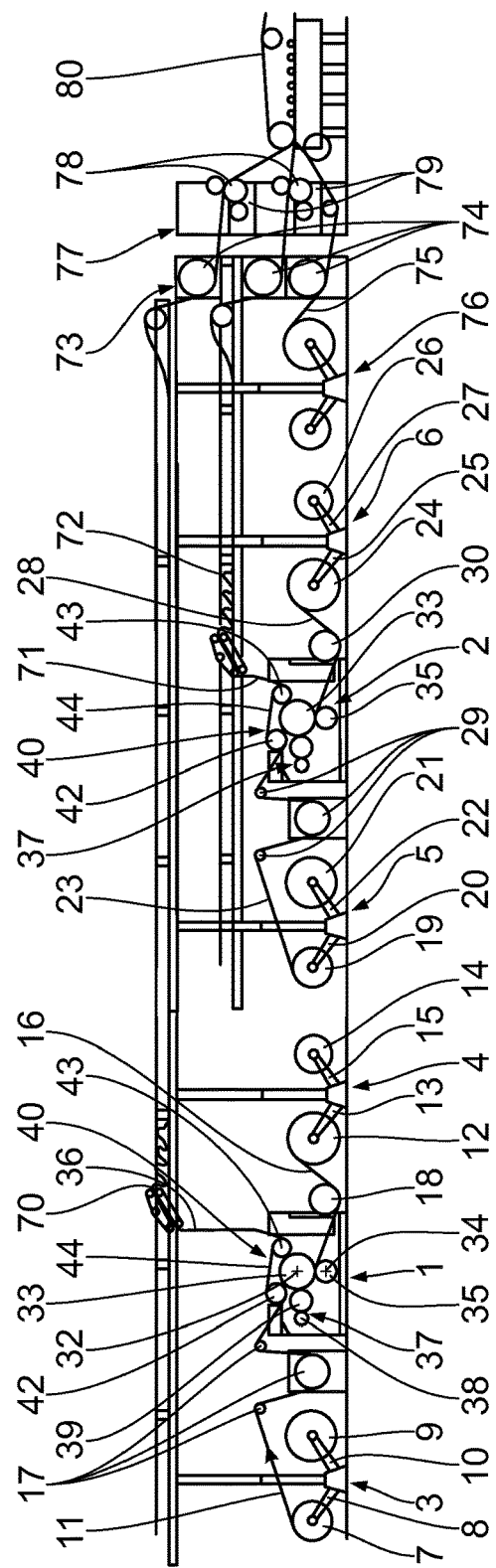
FIG. 1 shows a part of a corrugated board facility with arrangements according to the invention for producing corrugated board webs laminated on one side.
Figure 2:
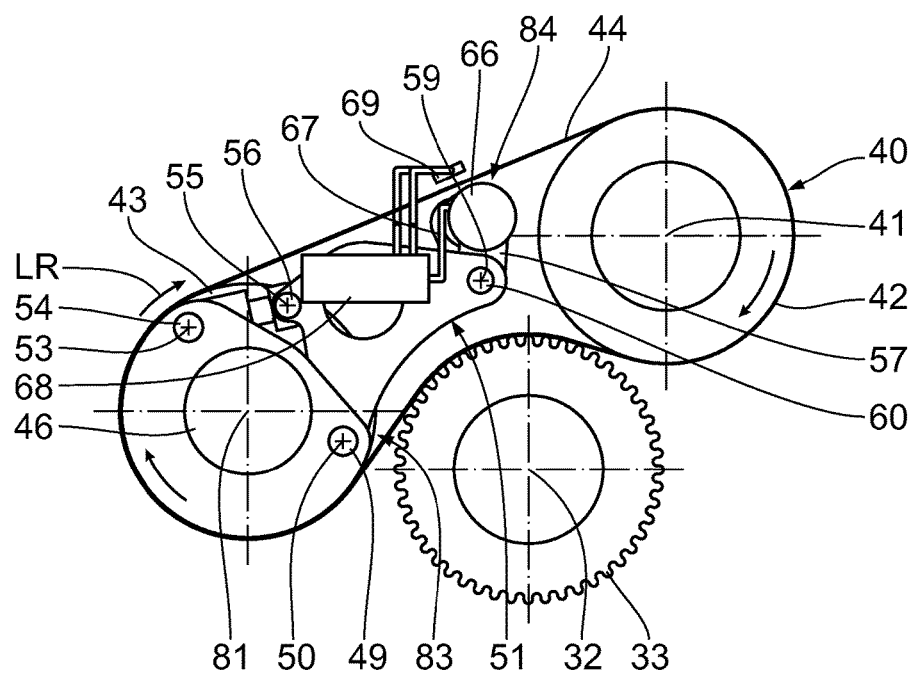
FIG. 2 shows a pressure belt module, which is arranged adjacent to a first corrugating roller, of an arrangement according to the invention shown in FIG. 1 for producing a corrugated board web laminated on one side.
Figure 3:
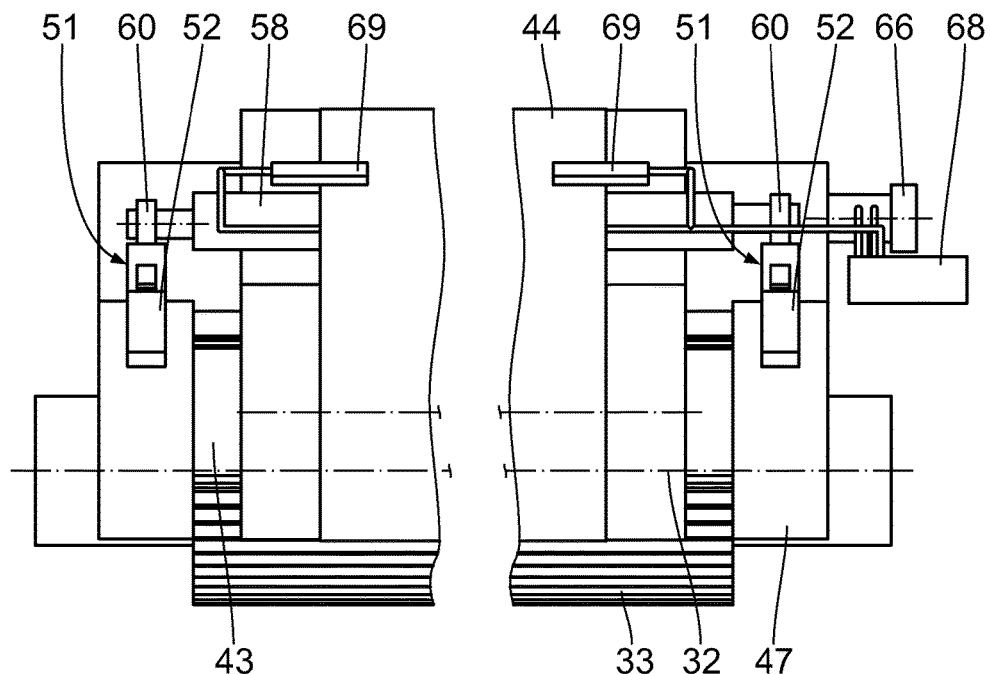
FIG. 3 shows a plan view of the pressure belt module shown in FIG. 2 and the first corrugating roller.
Figure 4:
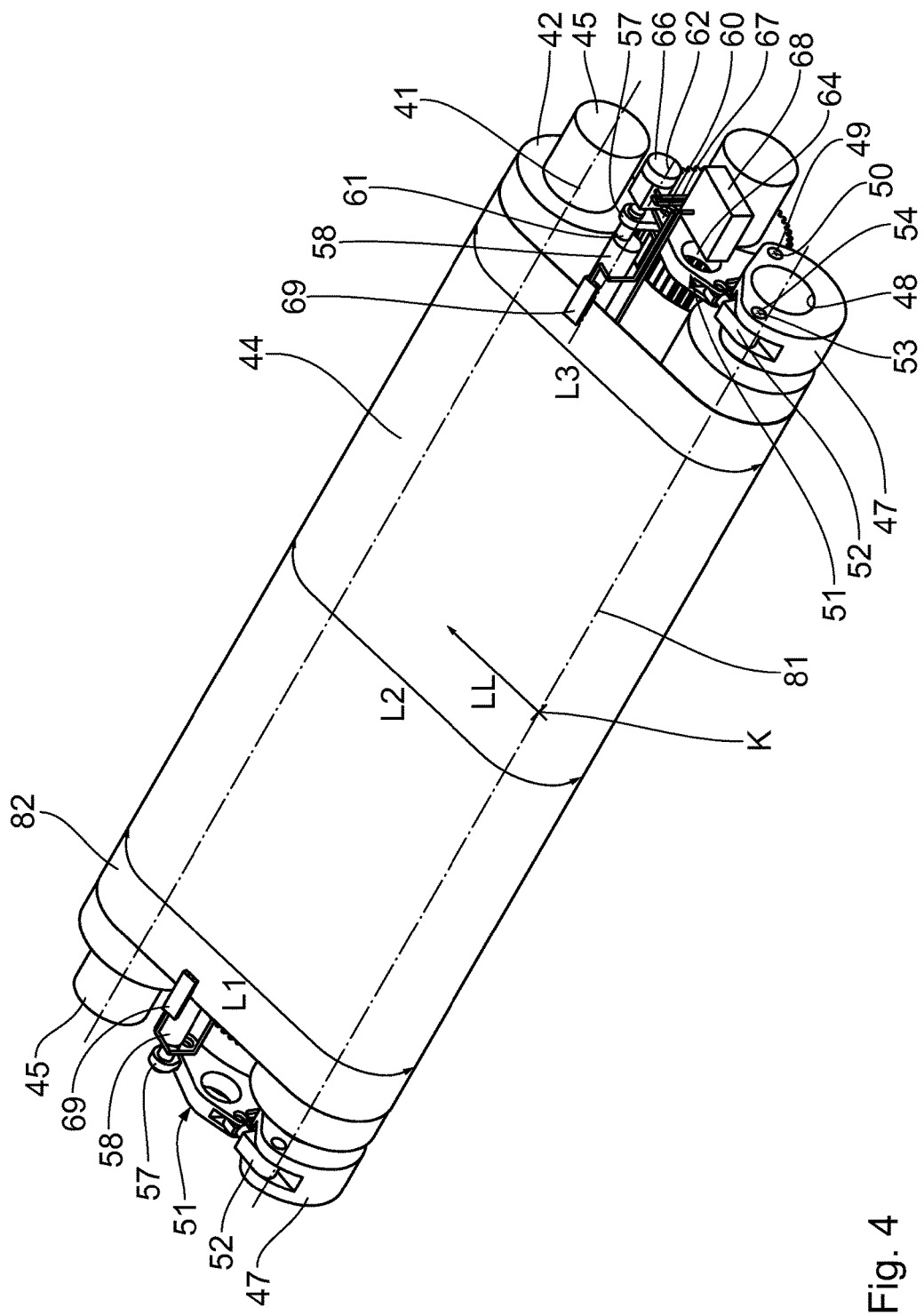
FIG. 4 shows a perspective view of the pressure belt module shown in FIGS. 2 and 3 and the first corrugating roller.
Figure 5:
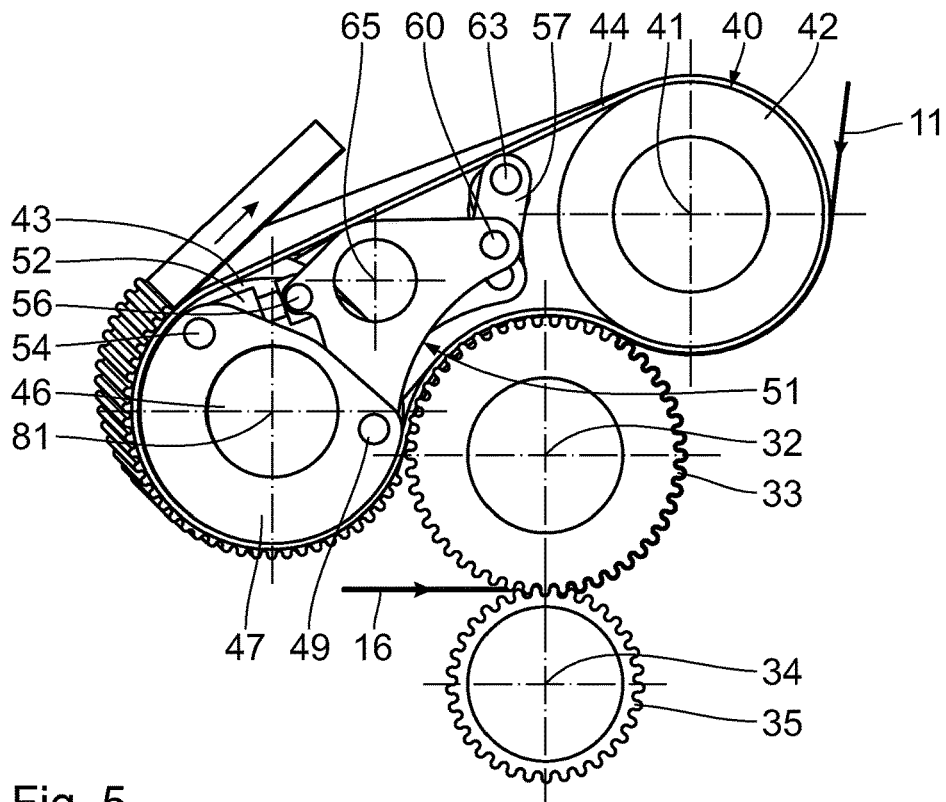
FIG. 5 shows a side view of the pressure belt module shown in FIGS. 2 to 4 and the first corrugating roller as well as a second corrugating roller, the belt tensioning and belt running regulating roller being in a first position.
Figure 6:
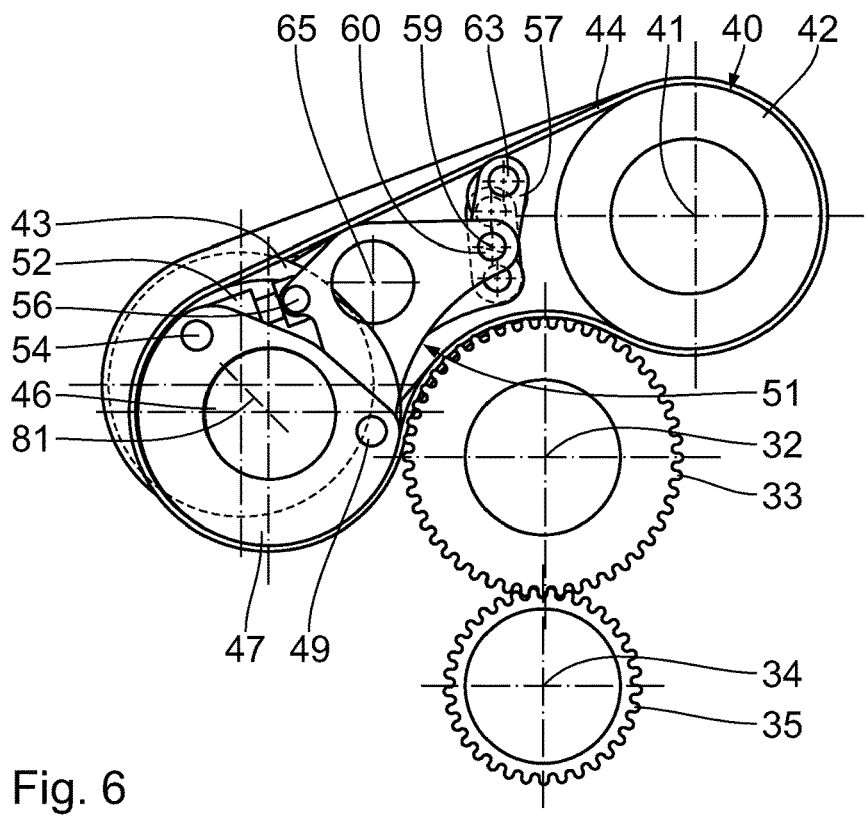
FIG. 6 shows a view corresponding to FIG. 5 with lines shown covered.
Figure 7:
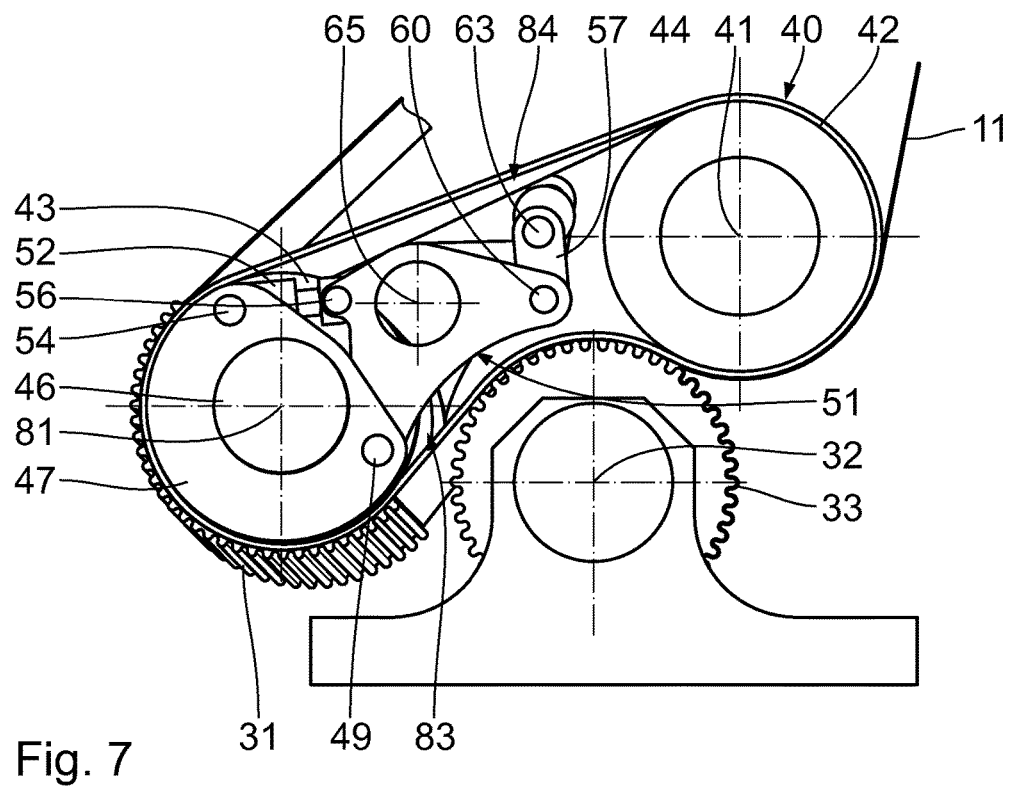
FIG. 7 shows a view corresponding to FIG. 5, the belt tensioning and belt running regulating roller being in a second position.
Figure 8:
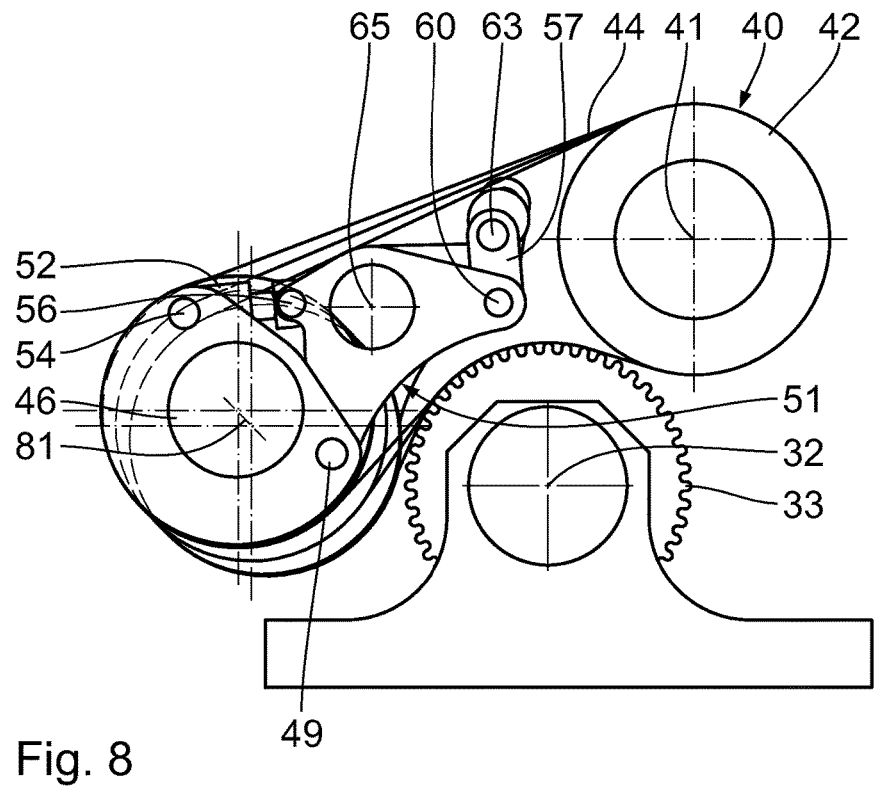
FIG. 8 shows a view corresponding to FIG. 7 with lines shown covered.
Figure 9:
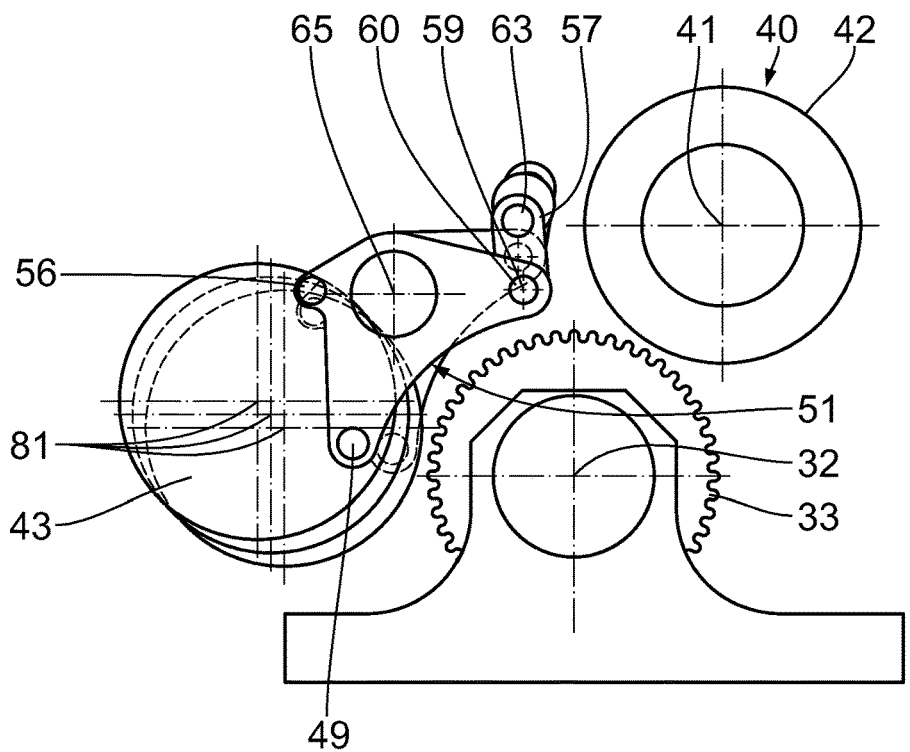
FIG. 9 shows a side view of the pressure belt module shown in FIGS. 2 to 8 and the first corrugating roller, the belt tensioning and belt running regulating roller being in a further position.

A corrugated board facility, as shown partially schematically in FIG. 1, comprises a first arrangement 1 for producing a continuous corrugated board web laminated on one side and a second arrangement 2 for producing a continuous corrugated board web laminated on one side.

A first splice mechanism 3 and a second splice mechanism 4 are associated with the first arrangement 1 for producing a continuous corrugated board web laminated on one side, while a third splice mechanism 5 and a fourth splice mechanism 6 are associated with the second arrangement 2 for producing a continuous corrugated board web laminated on one side.

The first splice mechanism 3 comprises a first unrolling unit 8 to unroll a finite first material web from a first material web roll 7 and a second unrolling unit 10 to unroll a finite second material web from a second material web roll 9. The finite first and second material web are connected to one another by means of a connecting and cutting unit, not shown, of the first splice mechanism 3 to provide a continuous first material web 11. With each connection of the finite first and second continuous webs to one another, a first connection seam is produced in the continuous first material web 11.

The second splice mechanism 4 is configured in accordance with the first splice mechanism 3. This has a third unrolling unit 13 to unroll a finite third material web from a third material web roll 12 and a fourth unrolling unit 15 to unroll a finite fourth material web from a fourth material web roll 14. The finite third and fourth material webs are connected to one another by means of a connecting and cutting unit, not shown, of the second splice mechanism 4 to provide a continuous second material web 16. With each connection of the third and fourth material webs to one another, a second connection seam is produced in the continuous second material web 16.

The continuous first material web 11 is fed by means of first deflection rollers 17 and the continuous second material web 16 is fed by means of at least one second deflection roller 18 of the first arrangement 1 to produce a continuous corrugated board web laminated on one side.

The third splice mechanism 5 is configured in accordance with the first splice mechanism 3. To unroll a finite fifth material web from a fifth material web roll 19 this comprises a fifth unrolling unit 20 and to unroll a finite sixth material web from a sixth material web roll 21 comprises a sixth unrolling unit 22. The finite fifth and sixth material webs are connected to one another to provide a continuous third material web 23 by means of a connecting and cutting unit, not shown, of the third splice mechanism 5. During each connection of the fifth and sixth material webs to one another, a third connection seam is produced in the continuous third material web 23.

The fourth splice mechanism 6 is configured substantially corresponding to the second splice mechanism 4. This comprises a seventh unrolling unit 25 to unroll a finite seventh material web from a seventh material web roll 24 and an eighth unrolling unit 27 to unroll a finite eighth material web from an eighth material web roll 26. The finite seventh and eighth material webs are connected to one another by means of a connecting and cutting unit, not shown, of the fourth splice mechanism 6 to provide a continuous fourth material web 28. During each connection of the seventh and eighth material webs to one another, a fourth connection seam is produced in the continuous fourth material web 28.

The continuous third material web 23 is fed by means of third deflection rollers 29 and the continuous fourth material web 28 is fed by means of at least one fourth deflection roller 30 of the second arrangement 2 to produce a continuous corrugated board web laminated on one side.

The first arrangement 1 for producing a continuous corrugated board web laminated on one side comprises a first corrugating roller 33 rotatably mounted about a first rotational axis 32 and a second corrugating roller 35 rotatably mounted about a second rotational axis 34 to produce a continuous first corrugated web 31 having a corrugation from the continuous second material web 16. The corrugating rollers 33, 35, to guide through and corrugate the continuous second material web 16, form a roller gap, the rotational axes 32, 34 running parallel to one another. The corrugating rollers 33, 35 form a corrugating mechanism.

To connect the continuous first corrugated web 31 to the continuous first material web 11 to form a first corrugated board web 36 laminated on one side, the first arrangement 1 for producing a continuous corrugated board web laminated on one side has a first glue application mechanism 37, which comprises a first glue metering roller 38, a first glue container (not shown) and a first glue application roller 39. To guide through and glue the continuous first corrugated web 31, the first glue application roller 39 with the first corrugating roller 33 forms a gap, the first glue application roller 39 being partially arranged within the first glue container. The glue is applied to tips of the corrugation. The first glue metering roller 38 rests against the first glue application roller 39 and is used to form a uniform glue layer on the first glue application roller 39.

The first material web 11 is then joined to the first corrugated web 31 provided with glue from the glue container in the first arrangement 1 for producing a continuous corrugated board web laminated on one side.

To press the first material web 11 against the first corrugated web 31 provided with glue, said corrugated web in turn resting in regions on the first corrugating roller 33, the first arrangement 1 for producing a continuous corrugated board web laminated on one side has a pressure belt module 40.

The pressure belt module 40 is arranged above the first corrugating roller 33. It has a deflection roller 42 rotatably mounted about a third rotational axis 41 and a rotatably mounted belt tensioning and belt running regulating roller 43 arranged downstream from the deflection roller 42 as well as a continuous pressure belt 44, which is guided around the deflection roller 42 and the belt tensioning and belt running regulating roller 43 in a running direction or peripheral direction LR. The third rotational axis 41 is fixed. The deflection roller 42 has two bearing journals 45 on the end face, which are rotatably mounted in deflection roller bearings (not shown).

The first corrugating roller 33 engages, in regions, in a space present between the deflection roller 42 and the belt tensioning and belt running regulating roller 43. The pressure belt 44 is deflected here by the first corrugating roller 33. The pressure belt 44 presses against the first material web 11, which is in turn pressed against the first corrugated web 31 provided with glue and resting on the first corrugating roller 33. In its mutually opposing outer edge regions 82, it has running lengths or wrap lengths L1 and L3 and, substantially centrally in between, a running length or wrap length L2. Ideally, the running lengths L1, L2, L3 are identical. During operation, these may, differ from one another without regulation.

The belt tensioning and belt running regulating roller 43 can be uniformly varied with respect to its spacing in relation to the deflection roller 42 and can also be tilted about a tilting point K in relation to said deflection roller.

The belt tensioning and belt running regulating roller 43 has two bearing journals 46 on the end face opposing one another, which have the form of a circle or circular ring in cross section. The belt tensioning and belt running regulating roller 43 has a longitudinal centre axis 81. Each bearing journal 46 is rotatably mounted in a bearing body 47 with a bearing opening 48 adapted to the respective bearing journal 46 about the longitudinal centre axis 81, which therefore also forms a rotational axis or bearing axis. Each bearing body 47 is articulated to a lever part 51 by means of an articulation body 49, which predetermines a pivot axis 50. The bearing bodies 47 are identical. The lever parts 51 are also identical.

Furthermore, a belt tensioning adjusting means 52 that can be adjusted with respect to length is functionally arranged between each bearing body 47 and the associated lever part 51. The belt tensioning adjusting means 52 are preferably telescopic. Each belt tensioning adjusting means 52 is connected in an articulated manner by means of a coupling body 54 predetermining a pivot axis 53 to the respective bearing body 47. In each bearing body 47, the articulation bodies 49 and the coupling bodies 54 are arranged spaced apart from the bearing opening 48 and spaced apart from one another. Moreover, each belt tensioning adjusting means 52 is connected in an articulated manner to the respective lever part 51 by means of a coupling body 56 predetermining a pivot axis 55. Moreover, in each lever part 51, the articulation bodies 49 are arranged spaced apart from the coupling bodies 56. The pivot axes 50, 53, 55 run parallel to one another.

Upon a uniform actuation of the two belt tensioning adjusting means 52, the bearing bodies 47 and the belt tensioning and belt running regulating roller 43 mounted therein are pivoted relative to the lever parts 51 about the pivot axis/axes 50. The tensioning movement of the belt tensioning and belt running regulating roller 43 is therefore in the form of a circular arc. This leads to a change in the tension in the pressure belt 44. If the belt tensioning and belt running regulating roller 43 is further removed from the deflection roller 42, the tension in the pressure belt 44 is increased. Conversely, the tension in the pressure belt 44 is reduced when the belt tensioning and belt running regulating roller 43 approaches the deflection roller 42.

The two lever parts 51 are substantially coupled to one another by means of coupling members 57 and a synchronous shaft 58. One of the coupling members 57 is articulated to each lever part 51 by means of a coupling part 60 predetermining a pivot axis 59. In each lever part 51, the pivot axes 59 are arranged spaced apart from the pivot axes 55. A connection means 61, which is rigidly connected to the synchronous shaft 58 at the end and runs eccentrically to the synchronous shaft longitudinal centre axis 62 thereof, engages in each coupling member 57. The connection means 61 are configured in the manner of a journal and are arranged on opposing ends of the synchronous shaft 58. The connection means 61 are arranged in a common plane of symmetry, which also goes through the synchronous shaft longitudinal centre axis 62. They have an identical spacing from the synchronous shaft longitudinal centre axis 62 and have connection means axes 63 running spaced apart or offset with respect to one another. The pivot axes 59, the synchronous shaft longitudinal centre axis 62 and the connection means axes 63 run parallel to one another and parallel to the pivot axes 50, 53, 55, when no regulation takes place.

A bearing opening 64 is arranged in each lever part 51 between the pivot axes 55, 59. A bearing body (not shown) engages in each bearing opening 64 and thus predetermines a pivot axis 65 for the respective lever part 51. The pivot axes 65 are fixed and run parallel to the pivot axes 50 when no regulation takes place. The bearing body is arranged on the adjacent bearing means, which rotatably mounts the deflection roller 42.

The synchronous shaft 58 is pivotable about its synchronous shaft longitudinal centre axis 62 by means of a pivot drive 66, which is directly or indirectly coupled to the synchronous shaft 58. A pivoting of the synchronous shaft 58 about it synchronous shaft longitudinal centre axis 62 in turn results in a displacement of the two connected connection means 61 about the synchronous shaft longitudinal centre axis 62. Owing to the coupling between the connection means 61 with the coupling members 57, these are then also pivoted about the coupling parts 60 or the pivot axis 59 thereof. The coupling parts 60 then in turn have an articulated connection to the two lever parts 51. Owing to the coupling of the two lever parts 51 by means of the synchronous shaft 58, the two lever parts 51 are pivoted in the opposite direction in relation to one another, which therefore results in a tilting of the belt tensioning and belt running regulating roller 53 about the tilting point K. The connection means 61 or lever parts 51 are pivoted by the same amount. If the one lever part 51 is thus moved upwardly, the other lever part 15 is lowered correspondingly by the same amount because of the coupling. The belt running regulating movement of the belt tensioning and belt running regulating roller 43 is therefore in the form of a circulating arc. The running lengths L1, L2, L3 of the pressure belt 44 preferably only marginally change during the tilting of the belt tensioning and belt running regulating roller 43. It is advantageous if substantially no adjusting moment is required to adjust the synchronous shaft 58.

When the belt tensioning and belt running regulating roller 43 is tilted relative to the deflection roller longitudinal centre axis 41 in order to change the direction of the pressure belt 44, the tension in the pressure belt 44 substantially remains unchanged across the width thereof. Adjustment of the belt tensioning and belt running regulating roller 43 by means of the belt running regulating adjustment mechanism 84 thus takes place in such a way that the tension in the pressure belt 44 substantially remains unchanged or is only slightly changed across the width thereof. In contrast thereto, pressure belt modules are known from prior art in which the tension in the pressure belt changes across its width when a regulating roller is tilted in order to change the direction of a pressure belt. Furthermore, pressure belt modules comprising belt tensioning rollers and belt running regulating rollers are known from prior art in which the tension of the pressure belt substantially remains unchanged when performing a simultaneous adjustment of a belt tensioning roller and a belt running regulating roller. The last-mentioned pressure belt modules however have a complex design.

The pivot drive 66 has a signal connection to a regulating mechanism 68 by means of a signal line 67. Furthermore, two detection sensors 69 have a signal connection to the regulating mechanism 68. The detection sensors 69 are oriented in such a way that they detect the edge regions 82 of the pressure belt 44 and a central region of the pressure belt 44 between the deflection roller 42 and the belt tensioning and belt running regulating roller 43 substantially opposing the first corrugating roller 33. The running lengths L1, L2, L3 are then determined. The belt tensioning and belt running regulating roller 43 is then optionally adjusted in such a way that the running lengths L1, L2 and L3 are substantially identical. The belt tension is optionally adjusted accordingly. The tilting point K is located substantially on a resulting linear load LL of the pressure belt 44. The linear load LL runs substantially perpendicularly to the belt running regulating movements of the belt tensioning and belt running regulating roller 43.

Figure 10:
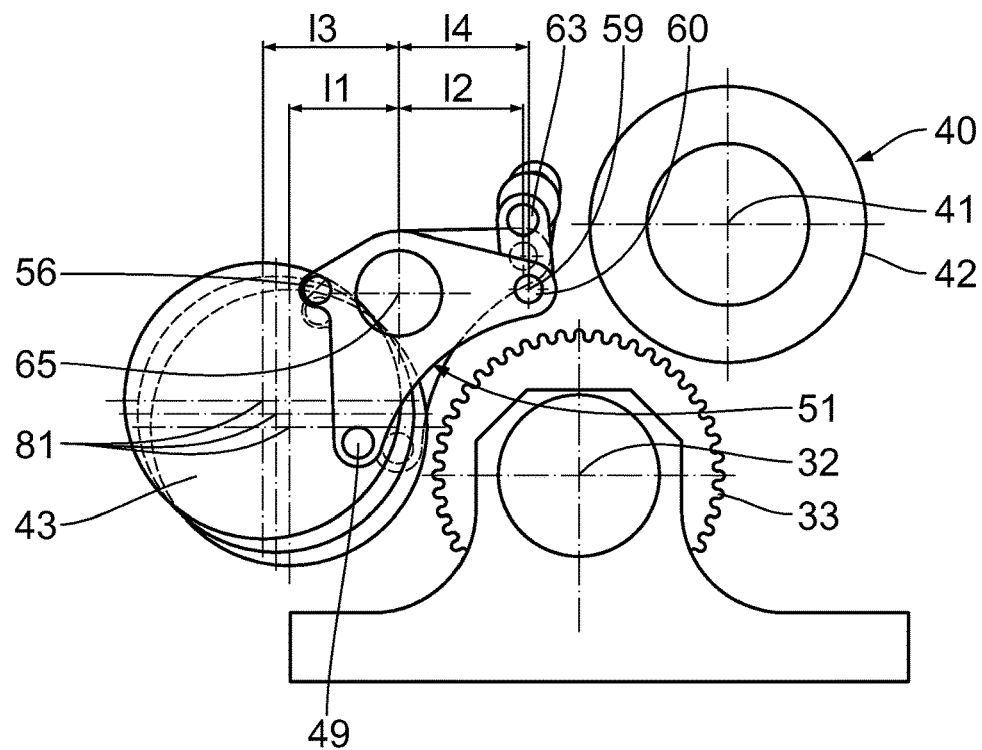

In FIG. 10, lever arm lengths 11, 12, 13 and 14, which all emanate from the pivot axis 65, are drawn in. The first lever arm 11 in this case goes up to the longitudinal centre axis 81 of the belt tensioning and belt running regulating roller 43 if this is in a first belt running regulating end position. The lever arm 13 goes to the longitudinal centre axis 81 of the belt tensioning and belt running regulating roller 43, if this is in the other, second belt running regulating end position. The lever arms 12 and 14 in each case go to the pivot axis 59 in their respective end position. It is advantageous if the ratios 11 to 12 and 13 to 14 are substantially identical.

A belt tensioning adjustment mechanism 83 is substantially formed by the bearing bodies 47 and the articulation bodies 49.

A belt running regulating adjustment mechanism 84 is substantially formed by the lever parts 51, the coupling members 57, the coupling parts 60, the connection means 61 and the synchronous shaft 58.

The belt tensioning adjustment mechanism 83 and the belt running regulating adjustment mechanism 84 form a belt tensioning and belt running regulating roller adjustment device 83, 84.

The pivot drive 66 forms an adjusting actuator. The pivot drive 66 and the belt tensioning adjusting means 52 form an adjusting device. They can be actuated together or separately.

To temporarily store and buffer the first corrugated board web 36 laminated on one side, the latter is fed to a first storage mechanism 70, where the latter has loops.

The second arrangement 2 is identical to the first arrangement 1. Reference is made to the previous description. The fourth material web 28 is corrugated by the corrugating rollers 33, 35, so a second corrugated web is then present. The second corrugated web is connected to the third material web 23, so a second corrugated board web 71 laminated on one side is produced. The second corrugated board web 71 is stored and buffered in a second storage mechanism 72.

Located downstream of the storage mechanisms 70, 72 is a preheating mechanism 73, which comprises three heating rollers 74 arranged one above the other. The first corrugated board web 36 laminated on one side and the second corrugated board web 71 laminated on one side and a cover web 75 are fed from a fifth splice mechanism 76 to the preheating mechanism 73 and partly encircle the respective heating roller 74.

Arranged behind the preheating mechanism 73 is a gluing device 77 with two gluing rollers 78 arranged one above the other, which are partly immersed in a glue bath 79. The corrugated board webs 36, 71 laminated on one side are in contact with the respective gluing roller 78.

Arranged behind the gluing device 77 is a heating device 80. The corrugated board webs 36, 71 laminated on one side and the cover web 75 are pressed onto one another and glued to one another in the heating device 80.

What is claimed is:

1. An arrangement for producing a continuous corrugated board web, which is laminated on one side, the arrangement comprising:
    a first corrugating roller and a second corrugating roller to produce a corrugated web having a corrugation;
    a glue application mechanism for applying glue to tips of the corrugation; and
    a pressure belt module comprising a deflection roller, a belt tensioning and belt running regulating roller, a continuous pressure belt, a belt tensioning and belt running regulating roller adjustment device to adjust the belt tensioning and belt running regulating roller, a pressure belt detection mechanism associated with the pressure belt, a pressure belt regulating mechanism and an adjusting device, the deflection roller comprising a deflection roller longitudinal center axis, the belt tensioning and belt running regulating roller comprising a belt tensioning and belt running regulating roller longitudinal center axis, the continuous pressure belt being guided about the deflection roller and the belt tensioning and belt running regulating roller to press a cover web onto the tips, which are provided with glue, of the corrugated web resting, in regions, on the first corrugating roller, wherein the belt tensioning and belt running regulating roller adjustment device comprises a belt tensioning adjustment device for tensioning the pressure belt by uniformly changing the spacing of the belt tensioning and belt running regulating roller longitudinal center axis from the deflection roller longitudinal center axis over the belt tensioning and belt running regulating roller longitudinal center axis, the belt tensioning and belt running regulating roller adjustment device further comprising a belt running regulating adjustment device to adjust the course of the pressure belt by tilting the belt tensioning and belt running regulating roller longitudinal center axis relative to the deflection roller longitudinal center axis, wherein to tilt the belt tensioning and belt running regulating roller relative to the deflection roller upon a local displacement of the belt tensioning and belt running regulating roller by an amount on a first side of the belt tensioning and belt running regulating roller, a reverse local displacement of another side of the belt tensioning and belt running regulating roller takes place by a same amount, wherein during tilting, an angle of the belt tensioning and belt running regulating roller changes with respect to the deflection roller, the pressure belt regulating mechanism having a signal connection to the pressure belt detection mechanism, the adjusting device being connected to the belt tensioning and belt running regulating roller adjustment device to adjust the belt tensioning and belt running regulating roller depending on regulating signals received from the pressure belt regulating mechanism, wherein the adjusting device comprises at least one belt tensioning adjusting means, wherein a length of the at least one belt tensioning adjusting means is adjustable, wherein the adjusting device comprises at least one belt running regulating adjusting actuator, the at least one belt running regulating adjusting actuator comprising a belt running regulating pivot adjusting actuator, wherein a tilting of the belt tensioning and belt running regulating roller relative to the deflection roller longitudinal center axis for adjusting the direction of the pressure belt takes place such that the tension of the pressure belt substantially remains unchanged across the width thereof, wherein the adjusting device adjusts the belt tensioning and belt running regulating roller in such a way that the running lengths of the pressure belt are substantially identical over the width thereof.

2. An arrangement according to claim 1, wherein the pressure belt detection mechanism detects at least two running lengths, which are spaced apart from one another over the width of the pressure belt, of the pressure belt in the running direction thereof.

3. An arrangement according to claim 1, wherein the pressure belt detection mechanism detects two edge running lengths of the pressure belt in the running direction thereof in mutually opposing edge regions of the pressure belt, wherein the pressure belt detection mechanism further detects a central running length of the pressure belt present between the edge running lengths in the running direction thereof.

4. An arrangement according to claim 1, wherein the belt tensioning and belt running regulating roller is rotatably mounted in a bearing mechanism.

5. An arrangement according to claim 4, wherein the bearing mechanism comprises a bearing body, which is arranged at the end with respect to the belt tensioning and belt running regulating roller and predetermines a respective bearing axis, for the rotatable mounting of the belt tensioning and belt running regulating roller.

6. An arrangement according to claim 5, wherein each bearing body is eccentrically articulated with respect to the bearing axis by means of an articulation body on a respective lever part and each bearing body is pivotable relative to the lever part.

7. An arrangement according to claim 6, wherein one of the belt tensioning adjusting means acts respectively between one bearing body and one lever part for the uniform pivoting of each bearing body about the articulation body.

8. An arrangement according to claim 6, wherein the belt running regulating adjustment mechanism comprises coupling members, each of the coupling members being connected to one of the lever parts by means of a coupling part.

9. An arrangement according to claim 8, wherein the coupling members are coupled to one another by means of a synchronous shaft by connection means, the connection means having connection means axes running parallel and spaced apart with respect to one another and having an identical spacing from a synchronous shaft longitudinal center axis for the displacement of the lever parts by the same amount in opposite directions.

10. An arrangement according to claim 8, wherein the coupling members are pivotable by the at least one adjusting actuator.

11. An arrangement according to claim 8, wherein each lever part, between the articulation body and the coupling part, comprises a pivot bearing means for its pivotable arrangement.

12. An arrangement according to claim 1, wherein the belt tensioning and belt running regulating roller is tiltable about a tilting point, the tilting point being substantially located on a resulting linear load of the pressure belt.

13. An arrangement according to claim 1, wherein the uniform change in the spacing of the belt tensioning and belt running regulating roller from the deflection roller takes place in the form of a curve.

14. An arrangement according to claim 1, wherein the uniform change in the spacing of the belt tensioning and belt running regulating roller from the deflection roller takes place in the form of a circular arc.

15. An arrangement according to claim 1, wherein a tilting of the belt tensioning and belt running regulating roller relative to the deflection roller longitudinal center axis for adjusting the direction of the pressure belt takes place in such a way that the running lengths of the pressure belt substantially remain identical across the width thereof.

16. An arrangement for producing a continuous corrugated board web, which is laminated on one side, the arrangement comprising:
   a first corrugating roller and a second corrugating roller to produce a corrugated web having a corrugation;
   a glue application mechanism for applying glue to tips of the corrugation; and
   a pressure belt module comprising a deflection roller, a belt tensioning and belt running regulating roller, a continuous pressure belt, a belt tensioning and belt running regulating roller adjustment device to adjust the belt tensioning and belt running regulating roller such that the belt tensioning and belt running regulating roller is movable in a direction of the first corrugating roller from a first position to a second position, a pressure belt detection mechanism associated with the pressure belt, a pressure belt regulating mechanism and an adjusting device, the deflection roller comprising a deflection roller longitudinal center axis, the belt tensioning and belt running regulating roller comprising a belt tensioning and belt running regulating roller longitudinal center axis, the continuous pressure belt being guided about the deflection roller and the belt tensioning and belt running regulating roller to press a cover web onto the tips, which are provided with glue, of the corrugated web resting, in regions, on the first corrugating roller, wherein the belt tensioning and belt running regulating roller adjustment device comprises a belt tensioning adjustment device for tensioning the pressure belt by uniformly changing the spacing of the belt tensioning and belt running regulating roller longitudinal center axis from the deflection roller longitudinal center axis over the belt tensioning and belt running regulating roller longitudinal center axis, the belt tensioning and belt running regulating roller adjustment device further comprising a belt running regulating adjustment device to adjust the course of the pressure belt by tilting the belt tensioning and belt running regulating roller longitudinal center axis relative to the deflection roller longitudinal center axis, wherein to tilt said belt tensioning and belt running regulating roller relative to said deflection roller upon a local displacement of said belt tensioning and belt running regulating roller by an amount on a first side of said belt tensioning and belt running regulating roller, a reverse local displacement of another side of said belt tensioning and belt running regulating roller takes place by a same amount, wherein the belt tensioning and belt running regulating roller is pivotable independent of movement of the deflection roller, wherein during tilting, an angle of said belt tensioning and belt running regulating roller changes with respect to said deflection roller, the pressure belt regulating mechanism having a signal connection to the pressure belt detection mechanism, said adjusting device being connected to the belt tensioning and belt running regulating roller adjustment device to adjust the belt tensioning and belt running regulating roller depending on regulating signals received from the pressure belt regulating mechanism, said adjusting device comprising an adjusting mechanism and at least one belt running regulating pivot adjusting actuator, wherein a length of said adjusting mechanism is adjustable, the belt tensioning and belt running regulating roller longitudinal center axis being located at a first distance from the first corrugating roller when the belt tensioning and belt running regulating roller is in the first position, the belt tensioning and belt running regulating roller longitudinal center axis being located at a second distance from the first corrugating roller when the belt tensioning and belt running regulating roller is in the second position, the first distance being greater than the second distance.

17. An arrangement according to claim 16, wherein the tilting of the belt tensioning and belt running regulating roller relative to the deflection roller longitudinal center axis for adjusting the direction of the pressure belt takes place such that the tension of the pressure belt substantially remains unchanged across the width thereof, wherein the adjusting device adjusts the belt tensioning and belt running regulating roller in such a way that the running lengths of the pressure belt are substantially identical over the width thereof, the at least one belt running regulating pivot adjusting actuator being pivotable about a pivot axis.

18. An arrangement for producing a continuous corrugated board web, which is laminated on one side, the arrangement comprising:
a first corrugating roller and a second corrugating roller to produce a corrugated web having a corrugation;
a glue application mechanism for applying glue to tips of the corrugation; and
a pressure belt module comprising a deflection roller, a belt tensioning and belt running regulating roller, a continuous pressure belt, a belt tensioning and belt running regulating roller adjustment device to adjust the belt tensioning and belt running regulating roller in a direction of the first corrugating roller from a first position to a second position, a pressure belt detection mechanism associated with the pressure belt, a pressure belt regulating mechanism and an adjusting device, the belt tensioning and belt running regulating roller being located at a first distance from the first corrugating roller in the first position, the belt tensioning and belt running regulating roller being located at a second distance from the second corrugating roller in the second position, the second distance being less than the first distance, the deflection roller comprising a deflection roller longitudinal center axis, the belt tensioning and belt running regulating roller comprising a belt tensioning and belt running regulating roller longitudinal center axis, the continuous pressure belt being guided about the deflection roller and the belt tensioning and belt running regulating roller to press a cover web onto the tips, which are provided with glue, of the corrugated web resting, in regions, on the first corrugating roller, wherein the belt tensioning and belt running regulating roller adjustment device comprises a belt tensioning adjustment device for tensioning the pressure belt by uniformly changing the spacing of the belt tensioning and belt running regulating roller longitudinal center axis from the deflection roller longitudinal center axis over the belt tensioning and belt running regulating roller longitudinal center axis, the belt tensioning and belt running regulating roller adjustment device further comprising a belt running regulating adjustment device to adjust the course of the pressure belt by tilting the belt tensioning and belt running regulating roller longitudinal center axis relative to the deflection roller longitudinal center axis, wherein only the belt tensioning and belt running regulating roller moves to adjust the course and tension of the pressure belt, wherein tilting the belt tensioning and belt running regulating roller relative to the deflection roller displaces the belt tensioning and belt running regulating roller in a first direction by a first displacement amount on one side of the belt tensioning and belt running regulating roller and displaces the belt tensioning and belt running regulating roller in a second direction by a second displacement amount on another side of the belt tensioning and belt running regulating roller, the first direction being opposite the second direction, the first displacement amount being equal to the second displacement amount, wherein during tilting, an angle of the belt tensioning and belt running regulating roller changes with respect to the deflection roller, the pressure belt regulating mechanism having a signal connection to the pressure belt detection mechanism, said adjusting device being connected to the belt tensioning and belt running regulating roller adjustment device to adjust the belt tensioning and belt running regulating roller depending on regulating signals received from the pressure belt regulating mechanism, said adjusting device comprising an adjusting mechanism and at least one belt running regulating pivot adjusting actuator, wherein a length of said adjusting mechanism is adjustable, said at least one belt running regulating pivot adjusting actuator being pivotable about a pivot axis.

19. An arrangement according to claim 18, wherein the adjusting device adjusts the belt tensioning and belt running regulating roller in such a way that the running lengths of the pressure belt are substantially identical over the width thereof.

20. An arrangement according to claim 1, wherein only the belt tensioning and belt running regulating roller is adjustable to adjust a course of the pressure belt and the tension of the pressure belt.

* * * * *